United States Patent Office 3,567,770
Patented Mar. 2, 1971

3,567,770
ARYL SUBSTITUTED-HYDROXY SUBSTITUTED CYCLOHEXANECARBOXYLIC ACIDS AND ESTERS
George Karmas, Bound Brook, N.J., assignor to Ortho Pharmaceutical Corporation
No Drawing. Filed Aug. 2, 1967, Ser. No. 662,295
Int. Cl. C07c *101/72*
U.S. Cl. 260—519          10 Claims

ABSTRACT OF THE DISCLOSURE

Hydroxyacids and hydroxyesters of the formula:

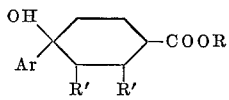

wherein R is hydrogen or lower alkyl, R' is lower alkyl and Ar is substituted aryl, are intermediates in the preparation of 2-lower alkyl-3-lower alkyl - 4 - arcyl-cyclohexenecarboxylic acids and esters which are active agents for the suppression of animal reproduction.

---

The compounds of the present invention are of the formula:

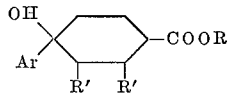

wherein R is hydrogen or lower alkyl of up to 8 carbon atoms, R' is lower alkyl of up to 6 carbon atoms and Ar is

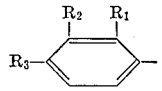

wherein $R_1$ is hydrogen, hydroxy, lower alkoxy of up to 4 carbon atoms, lower acyloxy of up to 5 carbon atoms or tetrahydropyranyl - 2 - oxy $R_2$ is hydrogen, hydroxy, lower alkyl of up to 4 carbon atoms, lower alkoxy of up to 4 carbon atoms, lower acyloxy of up to 5 carbon atoms, chlorine, tetrahydropyranyl - 2 - oxy or trifluoromethyl and $R_3$ is hydrogen, hydroxy, lower alkyl of up to 4 carbon atoms, lower acyloxy of up to 5 carbon atoms, diethylaminoethoxy, thiomethyl, trifluoromethyl, dimethylamino or tetrahydropyranyl-2-oxy, and wherein at least 1 and not more than 2 of $R_1$, $R_2$ and $R_3$ is hydrogen; 3,4-methylenedioxyphenyl, α-naphthyl or β-naphthyl.

The compounds of the present invention are prepared by the saponification of their corresponding lactones or by the reaction of an aryl Grignard reagent or an aryl lithium compound and a 2-lower alkyl - 3 - lower alkyl-4-ketocyclohexanecarboxylic acid. The preparation of the lactones is disclosed in my copending application Ser. No. 662,282 filed contemporaneously herewith now abandoned. The utilty of the 2-lower alkyl-3-lower alkyl-4-aryl-cyclohexenecarboxylic acids and esters prepared from the compounds of the present invention is fully described in my copending application Ser. No. 662,311 filed contemporaneously herewith.

The preparation of the compounds of the invention is illustrated by the following reaction schemes:

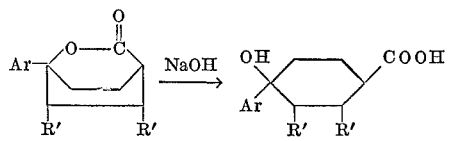

and

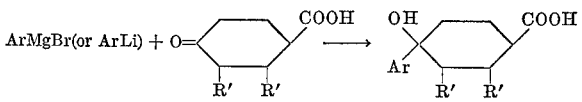

The compounds of the invention are used to prepare the final 2-lower alkyl-3-lower alkyl-4-aryl-cyclohexenecarboxylic acids and esters according to the following reaction scheme:

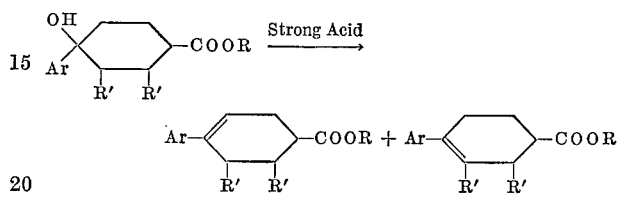

Typical lactone starting materials for the compounds of the present invention are the lactones of:

2-methyl-2-ethyl-4-hydroxy-4-(m-anisyl)-cyclohexanecarboxylic acid,
2,3-dimethyl-4-hydroxy-4-(m-anisyl)-cyclohexanecarboxylic acid,
2,3-diethyl-4-hydoxy-4-(m-anisyl)-cyclohexanecarboxylic acid,
2-methyl-3-propyl-4-hydroxy-4-(m-anisyl)-cyclohexanecarboxylic acid,
2-propyl-3-butyl-4-hydroxy-4-(m-anisyl)-cyclohexanecarboxylic acid,
2,3-dimethyl-4-hydroxy-4-(m-tetrahydropyranyloxyphenyl)cyclohexanecarboxylic acid,
2,3-diethyl-4-hydroxy-4-(m-tetrahydropyranyloxyphenyl)cyclohexanecarboxylic acid,
2-ethyl-3-butyl-4-hydroxy-4-(3,4-methylenedioxyphenyl)-cyclohexanecarboxylic acid,
2,3-diethyl-4-hydroxy-4-(p-trifluoromethylphenyl)-cyclohexanecarboxylic acid,
2,3-dibutyl-4-hydroxy-4-(m-trifluoromethylphenyl)-cyclohexanecarboxylic acid,
2-methyl-3-propyl-4-hydroxy-4-(o-methoxy-p-acetoxyphenyl)cyclohexanecarboxylic acid,
2-methyl-3-butyl-4-hydroxy-4-(o,p-diacetoxyphenyl)-cyclohexanecarboxylic acid, The following examples illustrate the preparation of the compounds of the invention.

EXAMPLE I 2-methyl-3-ethyl-4-hydroxy-4-(m-anisyl)cyclohexanecarboxylic acid

A mixture of 10.0 g. of the lactone of 2-methyl-3-ethyl-4-hydroxy-4-(m-anisyl)cyclohexanecarboxylic acid, 10.0 g. of sodium hydroxide, 100 ml. of methanol and 100 ml. of water is stirred and refluxed for two hours and is then dilutel with 250 ml. of water and evaporated to remove the methanol. The solution is acidified with dilute hydrochloric acid, and is extracted with ether. The ether solution is rapidly washed with water, dried over anhydrous magnesium sulfate and filtered. The residue is recrystallized from ether to afford 2-methyl-3-ethyl-4-hydroxy - 4-(m-anisyl)cyclohexanecarboxylic acid; M.P. 203–204° C.

λλ max.: 2.83, 5.87 and 5.94 (split, 7.78, 8.03, 10.23, 12.80, 14.27μ (KBr)
NMR (pyr.): 0.63, 0.75, 0.87; 1.46, 1.57; 2.96

Following the procedure of Example I, but starting with the appropriate lactone, there are prepared:

| Example | Compound formed | M.P., ° C. | U.V. max. (KBr) |
|---|---|---|---|
| II | 2-methyl-3-ethyl-4-hydroxy-4-(o-anisyl)-cyclohexanecarboxylic acid | 187–188 | 2.82, 5.87 and 5.97 (split), 7.74, 8.10, 9.67, 13.20μ. |
| III | 2-methyl-3-ethyl-4-hydroxy-4-(p-thioanisyl)-cyclohexanecarboxylic acid | 189–190 | 2.83, 5.90, 7.99, 10.37, 11.00, 12.29μ. |
| IV | 2-methyl-3-ethyl-4-hydroxy-4-(p-tolyl)cyclohexanecarboxylic acid | 201–202 | 2.82, 5.90, 8.10, 10.32, 12.27, 14.10μ. |
| V | 2-methyl-3-ethyl-4-hydroxy-4-(m-tolyl)cyclohexanecarboxyl c acid | 154–155 | 2.82, 5.89, 8.01, 8.40, 9.60, 12.78, 13.62μ. |
| VI | 2-methyl-3-ethyl-4-hydroxy-4-(p-trifluoromethylphenyl)cyclohexanecarboxylic acid | 200–201 | 2.83, 5.87 and 5.98 (split), 7.50, 8.92, 9.30, 11.81, 12.02μ. |
| VII | 2-methyl-3-ethyl-4-hydroxy-4-(m-trifluoromethylphenyl)cyclohexanecarboxylic acid | 160–170 | 2.85, 5.83 and 5.97 'split), ,7.50, 8.60, 8.92, 12.48, 14,22, 14.49μ. |
| VIII | 2-methyl-3-ethyl-4-hydroxy-4-(3,4-methylenedioxyphenyl)cyclohexanecarboxylic acid | 196–197 | 2.82, 5.86 and 5.94 (split), 8.00, 9.60, 10.63, 12.35μ. |
| IX | 2-methyl-3-ethyl-4-hydroxy-4-(α-naphthyl)-cyclohexanecarboxylic acid | 177–178 | 2.82, 5.87 and 5.95 (split), 7.70, 10.13, 11.60, 12.47, 12.89μ. |
| X | 2-methyl-3-ethyl-4-hydroxy-4-(β-naphthyl)-cyclohexanecarboxylic acid | 216–217 | 2.85, 5.90, 8.00, 8.58, 11.67, 12.20, 13.33μ. |
| XI | 2-methyl-3-ethyl-4-hydroxy-4-(α-thienyl)-cyclohexanecarboxylic acid | 164–166 | 2.83, 5.88, 8.02, 9.62, 10.10, 11.79, 14.15, 14.33μ. |
| XII | 2-methyl-3-ethyl-4-hydroxy-4-benzylcyclohexanecarboxylic acid | 142–143 | 2.88, 5.84, 8.23, 10.14, 11.51, 13.03, 14.15μ. |
| XIII | 2-methyl-3-propyl-4-(p-anisyl)cyclohexanecarboxylic acid | 196–197 | 2.84, 5.90, 7.99, 9.57, 11.90, 12.35μ. |

EXAMPLE XIV 2-methyl-3-ethyl-4-hydroxy-4-(m-tetrahydropyranyloxyphenyl)cyclohexanecarboxylic acid A mixture of 10.0 g. of the lactone of 2-methyl-3-ethyl-4-hydroxy - 4 - (m - tetrahydropyranyloxyphenyl)cyclohexanecarboxylic acid, 10.0 g. of sodium hydroxide, 100 ml. of methanol and 100 ml. of water is stirred and refluxed for two hours. It is then diluted with 250 ml. of water and evaporated to remove methanol. The insoluble oily material is removed by extraction with ether and is discarded. 200 ml. of methylene chloride is added to the solution and the mixture is stirred and is maintained at 0–5° C. while making the mixture barely acidic with cold dilute hydrochloric acid. The methylene chloride phase is separated, washed twice with brine, dried over anhydrous magnesium sulfate and evaporated to a residue. The residue is recrystallized from ether to afford 2-methyl-3-ethyl-4-hydroxy - 4 - (m-tetrahydropyranyloxyphenyl)cyclohexanecarboxylic acid, M.P. 149–151° C.

λλ max: 2.83, 5.88, 8.02, 8.98, 9.61, 10.34, 10.92μ (KBr)
NMR (pyr.): 0.62, 0.73, 0.85; 1.46, 1.58; 2.95

Folowing the procedure of Example XIV, there are prepared:

EXAMPLE XV 2-methyl-3-ethyl - 4 - hydroxy-4-(o-tetrahydropyranyloxyphenyl)cyclohexanecarboxylic acid; M.P. 164–166° C.

λλ max.: 2.88, 5.87, 8.13, 10.24, 10.85, 11.52, 13.28μ (KBr) NMR (pyr.): 0.67, 0.79, 0.90; 1.47, 1.58; 2.97

EXAMPLE XVI 2-methyl - 3 - ethyl- 4 - hydroxy-4-(o-methoxy-p-tetrahydropyranyloxyphenyl)cyclohexanecarboxylic acid, M.P. 118–130° C.

λλ max.: 2.86, 5.87, 8.31, 9.62, 10.10, 11.04, 11.92μ (KBr)
NMR (pyr.): 0.65, 0.76, 0.88; 1.46, 1.57; 2.93
NMR (CDCl₃): 0.67, 0.78, 0.89; 1.02, 1.13; 1.82, 2.57

EXAMPLE XVII 2-methyl-3-ethyl - 4 - hydroxy-(o,p-bis-tetrahydropyranyloxyphenyl)cyclohexanecarboxlic acid, M.P. 100–108° C.

λλ max.: 2.88, 5.87, 7.99, 9.61, 9.97, 10.38, 10.95, 11.85, 11.85μ (KBr)
NMR (pyr.): 0.73, 0.85, 0.96; 1.52, 1.63; 2.98
Calcl. for $C_{26}H_{38}O_7$ (percent): C, 67.51; H, 8.28. Found (percent): 67.00; H, 8.33.

EXAMPLE XVIII 2-methyl-3-ethyl-4-hydroxy-4-(m-hydroxyphenyl)-cyclohexanecarboxylic acid A suspension of 10.0 g. of 2-methyl-3-ethyl-4-hydroxy-4 - (m - tetrahydropyranyloxyphenyl)cyclohexanecarboxylic acid (as prepared in Example XIV) in 260 ml. of methanol containing 35 ml. of water and 1.5 ml. of 12 N hydrochloric acid is stirred at 25° C. for forty minutes. To the resulting clear solution is added 260 ml. of water and 5 ml. of pyridine and the solution is evaporated to remove methanol while precipitating the phenolic hydroxy acid. The mixture is acidified with dilute hydrochloric acid and the product is extracted with ether. The ether solution is washed twice with water, dried over anhydrous magnesium sulfate and evaporated to dryness. The residue is recrystallized from ether-methylene chloride to afford 2-methyl-3-ethyl-4-hydroxy-4-(m-hydroxyphenyl)cyclohexanecarboxylic acid, M.P. 211–213° C.

λλ max.: 2.96, 3.15, 5.78, 7.50, 9.60, 10.26, 12.68, 13.31, 14.23μ (KBr)
NMR (pyr.): 0.63, 0.74, 0.85; 1.45, 1.57; 2.92

EXAMPLE XIX 2-methyl-3-ethyl-4-hydroxy-4-(o-hydroxyphenyl)-cyclohexanecarboxylic acid Following the procedure of Example XVIII, but starting with 2-methyl - 3 - ethyl-4-hydroxy-4-(o-tetrahydropyranyloxyphenyl)cyclohexanecarboxylic acid (as prepared in Example XV), there is afforded 2-methyl-3-ethyl - 4 - hydroxy - 4 - (o-hydroxyphenyl)cyclohexanecarboxylic acid, M.P. 190–191° C.

λλ max.: 2.82, 3.04, 5.90, 8.06, 10.40, 10.69, 10.92, 13.23μ (KBr)
NMR (pyr.): 0.67, 0.78, 0.89; 1.42, 1.53; 2.96

EXAMPLE XX 2-methyl-3-ethyl-4-hydroxy-4-(o,p-dihydroxyphenyl)-cyclohexanecarboxylic acid Following the procedure of Example XVIII, but starting with 2-methyl - 3 - ethyl - 4 - hydroxy-4-(o,p-bis-tetrahydropyranyloxyphenyl)cyclohexanecarboxylic acid (as prepared in Example XVII), there is afforded 2-mehtyl-3-ethyl - 4 - hydroxy-4-(o,p-dihydroxyphenyl)cyclohexanecarboxylic acid, M.P. 169–171° C.

λλ max.: 2.85, 2.95, 3.12, 5.90, 8.62, 8.89, 10.21, 11.81, 12.10, 12.42μ (KBr)
NMR (pyr.): 0.72, 0.82, 0.93; 1.40, 1.52; 2.92

EXAMPLE XXI 2-methyl-3-ethyl-4-hydroxy-4-(o-methoxy-p-hydroxyphenyl)cyclohexanecarboxylic acid Following the procedure of Example XVIII, but starting with 2-methyl-3-ethyl-4-hydroxy-4-(o-methoxy-p-tetrahydropyranyloxyphenyl)cyclohexanecarboxylic acid (as prepared in Example XVI), there is afforded 2-methyl-3-ethyl - 4 - hydroxy-4-(o-methoxy-p-hydroxyphenyl)cyclohexanecarboxylic acid, M.P. 128–131° C.

λλ max.: 2.95, 5.88, 8.31, 9.65, 10.33, 11.97μ (KBr)
NMR (pyr.): 0.67, 0.78, 0.90; 1.46, 1.57; 2.94

EXAMPLE XXII 2-methyl-3-ethyl-4-hydroxy-4-(m-acetoxyphenyl)cyclohexanecarboxylic acid To a solution of 2.0 g. of 2-methyl-3-ethyl-4-hydroxy-4-(m-hydroxyphenyl)cyclohexanecarboxylic acid (as prepared in Example XVIII), in 25 ml. of pyridine is added with stirring 3 ml. of acetic anhydride. The solution is maintained at 25° C. for twenty hours and is then hydrolyzed with ice and water. The oily products are extracted with ether. The ether solution is washed with cold dilute hydrochloric acid to remove pyridine and is then extracted with three cold portions of 7% aqueous potassium carbonate with each successive carbonate wash being immediately acidified with dilute hydrochloric acid. A tacky precipitate from the carbonate solutions is extracted with ether and the combined ether solution is dried and evaporated at 25° C. The residue is recrystallized from ether to afford 2-methyl-3-ethyl-4-hydroxy-4-(m-acetoxyphenyl)cyclohexanecarboxylic acid, M.P. 172–173° C.

λλ max.: 2.83, 5.68, 8.30, 9.63, 10.71, 12.73μ (KBr)
NMR (pyr.): 0.61, 0.71, 0.82; 1.44, 1.55; 2.94

EXAMPLE XXIII 2-methyl-3-ethyl-4-hydroxy-4-(o-acetoxyphenyl)cyclohexanecarboxylic acid Following the procedure of Example XXII, but starting with 2-methyl-3-ethyl-4-hydroxy-4-(o-hydroxyphenyl)cyclohexanecarboxylic acid (as prepared in Example XIX), theer is afforded 2-methyl-3-ethyl-4-hydroxy-4-(o-acetoxyphenyl)cyclohexanecarboxylic acid, M.P. 132–133° C.

λλ max.: 2.82, 5.72, 5.89, 8.20, 8.48, 13.09μ (KBr)
NMR (pyr.): 0.68, 0.80, 0.91; 1.43, 1.55; 296

EXAMPLE XXIV 2-methyl-3-ethyl-4-hydroxy-4-(o,p-diacetoxyphenyl)cyclohexanecarboxylic acid Following the procedure of Example XXII, but starting with 2-methyl-3-ethyl-4-hydroxy-4-(o,p-dihydroxyphenyl)cyclohexanecarboxylic acid (as prepared in Example XX), there is afforded 2-methyl-3-ethyl-4-hydroxy-4-(o,p-diacetoxyphenyl)cyclohexanecarboxylic acid, M.P. 110–112° C.

λλ max.: 2.85, 5.68, 8.10–8.40, 9.80, 10.87μ (KBr)
NMR (CDCl₃): 0.64, 0.75, 0.86; 0.99, 1.10; 1.89, 2.59

The o-acetoxyphenyl-hydroxy acids prepared according to Examples XXIII and XXIV are unstable and begin to decompose after a few days at 25° C. They are fully decomposed within two to three weeks at 25° C. the decomposition follows the route:

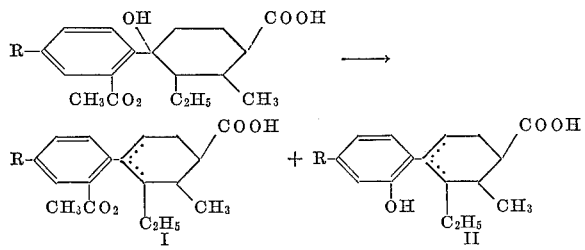

Compounds I and II are mixtures of the Δ³ and Δ⁴ isomers.

EXAMPLE XXV 2-methyl-3-ethyl-4-hydroxy-4-(m-chlorophenyl)cyclohexanecarboxylic acid The Grignard reagent from 0.32 mole of m-chlorobromobenzene, prepared in a mixture of ether and tetrahydrofuran, is stirred at −40° and to it is added 0.1 mole of 2-methyl-3-ethyl-4-ketocyclohexanecarboxylic acid in 40 ml. of tetrahydrofuran. This reaction mixture is stirred vigorously and heated at the reflux temperature for two hours and then it is cooled in ice and hydrolyzed with 400 ml. of saturated aqueous ammonium acetate. After filtration to remove magnesium, the layers are separated and the organic phase is dried and evaporated to a tacky, semi-crystalline residue. Recrystallization from ether or nitromethane affords 9.0 g. of 2-methyl-3-ethyl-4-hydroxy-4 - (m - chlorophenyl)cyclohexanecarboxylic acid, M.P. 166–169° C.

λλ max.: 2.83, 5.89, 8.01, 12.77, 13.79μ (KBr)
NMR (pyr.): 0.59, 0.70, 0.80; 1.40, 1.52; 2.92

The alkyl esters of the compounds of the invention are prepared by treatment of metal salts of the hydroxyacids with an appropriate dialkyl sulfate.

EXAMPLE XXVI

Methyl 2-methyl-3-ethyl-4-hydroxy-4-phenylcyclohexanecarboxylate

A solution of 4.0 g. of 2-methyl-3-ethyl-4-hydroxy-4-phenylcyclohexanecarboxylic acid and 1.5 g. of sodium hydroxide in 40 ml. of methanol and 150 ml. of dimethylformamide is evaporated under vacuum to a volume of 100 ml. The resulting suspension is stirred and cooled to 15° C. 3.5 ml. of dimethyl sulfate is added and the mixture is stirred at 25° C. for thirty minutes and is then evaporated under vacuum to remove most of the dimethylformamide. The residue of about 15–20 ml. is shaken with ether and water, and the ether solution is washed with cold 5% sodium hydroxide, followed by four portions of water. The ether solution is dried and evaporated to a residue. The residue is recrystallized from hexane to afford methyl 2 - methyl - 3-ethyl-4-hydroxy-4-phenylcyclohexanecarboxylate, M.P. 112–113° C.

λλ max.: 2.87, 5.79, 8.21, 8.55, 13.29, 14.30μ (KBr)
Calcd. for C₁H₂₄O₃ (percent): C, 73.88; H, 8.75. Found (percent): C, 74.00; H, 8.76.

EXAMPLE XXVII

Methyl 2-methyl-3-ethyl-4-hydroxy-4-(p-trifluoromethylphenyl)cyclohexanecarboxylate Following the procedure of Example XXVI, but starting with 2-methyl - 3-ethyl - 4-hydroxy-4-(p - trifluoromethylphenyl)cyclohexanecarboxylic acid, there is afforded methyl 2 - methyl - 3 - ethyl - 4 -hydroxy-4-(p-trifluoromethylphenyl)cyclohexanecarboxylate, M.P. 112–113° C.

λλ max.: 2.89, 5.88, 7.49, 7.82, 8.61, 8.90, 9.29, 9.84, 11.81, 12.04μ (KBr)
Calcd. for C₁₈H₃₃O₃F₃ (percent): C, 62.79; H, 6.73. Found (percent): C, 63.07; H, 6.73.

EXAMPLE XXVIII

Methyl 2-methyl-3-ethyl-4-hydroxy-4-(m-trifluoromethylphenyl)cyclohexanecarboxylate Following the procedure of Example XXVI, but starting with 2-methyl - 3-ethyl - 4-hydroxy - 4-(m-trifluoromethylphenyl)cyclohexanecarboxylic acid, there is afforded methyl 2-methyl-3-ethyl-4 - hydroxy-4 - (m-trifluoromethylphenyl)cyclohexanecarboxylate, M.P. 122–124° C.

λλmax.: 2.87, 5.80, 7.50, 8.61, 8.87, 9.24, 12.50, 14.17μ (KBr)
Calcd. for C₁₈H₃₃O₃F₃ (percent): C, 62.79; H, 6.73. Found (percent): C, 62.67; H, 6.73.

Following the procedure of Example XXVI by the selection of the appropriate hydroxy acid and dialkyl sulfate, there are prepared:

ethyl 2-methyl-3-ethyl-4-hydroxy-4-benzylcyclohexanecarboxylate,
propyl 2-methyl-3-propyl-4-hydroxy-4-benzylcyclohexanecarboxylate,
ethyl 2-ethyl-3-methyl-4-hydroxy-4-benzylcyclohexanecarboxylate, ethyl, 2,3-dimethyl-4-hydroxy-4-benzylcyclohexane-
carboxylate,
ethyl 2,3-diethyl-4-hydroxy-4-benzylcyclohexanecarboxylate,
butyl 2-methyl-3-ethyl-4-hydroxy-4-benzylcyclohexanecarboxylate,
butyl 2-ethyl-3-butyl-4-hydroxy-4-benzylcyclohexanecarboxylate,
butyl 2-methyl-3-ethyl-4-hydroxy-4-(m-tolyl)cyclohexanecarboxylate, and
butyl 2-methyl-3-propyl-4-hydroxy-4-(m-tolyl)cyclohexanecarboxylate.

What is claimed is:
1. A compound of the formula

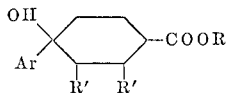

wherein R is selected from the group consisting of hydrogen and lower alkyl of up to 8 carbon atoms, R' is selected from the group consisting of lower alkyl of up to 6 carbon atoms and Ar is selected from the group consisting of

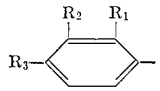

wherein $R_1$ is selected from the group consisting of hydrogen and hydroxy, $R_2$ is selected from the group consisting of hydrogen, hydroxy and lower alkyl of up to 4 carbon atoms, chlorine and trifluoromethyl and $R_3$ is hydrogen, hydroxy, lower alkyl of up to 4 carbon atoms, diethylamino and wherein at least 1 and not more than 2 of $R_1$, $R_2$ and $R_3$ is hydrogen and at least one of $R_1$, $R_2$ and $R_3$ is other than hydroxy; α-naphthyl or β-naphthyl.

2. A compound of the formula

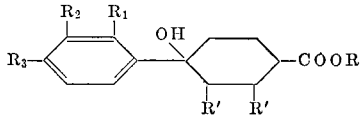

wherein R is selected from the group consisting of hydrogen and lower alkyl of up to 8 carbon atoms, R' is selected from the group consisting of lower alkyl of up to 6 carbon atoms, $R_1$ is selected from the group consisting of hydrogen, and lower alkyl of up to 4 carbon atoms, $R_2$ is selected from the group consisting of hydrogen, lower alkyl of up to 4 carbon atoms, chlorine and trifluoromethyl and $R_3$ is selected from the group consisting of hydrogen, lower alkyl of up to 4 carbon atoms, diethylaminoethoxy, trifluoromethyl, and dimethylamino and wherein at least one and not more than two of $R_1$, $R_2$ and $R_3$ is hydrogen.

3. 2-methyl - 3-ethyl - 4-hydroxy-4-(p - tolyl)cyclohexanecarboxylic acid according to claim 2.

4. 2-methyl - 3-ethyl - 4-hydroxy - 4-(m-tolyl)cyclohexanecarboxylic acid according to claim 2.

5. 2-methyl - 3-ethyl - 4-hydroxy - 4-(p-diethylaminoethoxyphenyl)cyclohexanecarboxylic acid according to claim 2.

6. 2-methyl - 3-ethyl - 4-hydroxy - 4-(p-trifluoromethylphenyl)cyclohexanecarboxylic acid according to claim 2.

7. 2-methyl - 3-ethyl - 4-hydroxy - 4-(m-trifluoromethylphenyl)cyclohexanecarboxylic acid according to claim 2.

8. 2-methyl - 3-ethyl - 4-hydroxy - 4-(m-chlorophenyl)-cyclohexanecarboxylic acid according to claim 2.

9. 2-methyl - 3-ethyl - 4-hydroxy - 4-(α-naphthyl)cyclohexanecarboxylic acid.

10. 2-methyl - 3-ethyl - 4-hydroxy - 4-(β-naphthyl)cyclohexanecarboxylic acid.

References Cited

Nathan, et al.: "Journ. Amer. Chem. Soc." vol. 78 (1956) pp. 6163–66.

ALEX MAZEL, Primary Examiner

J. H. TURNIPSEED, Assistant Examiner

U.S. Cl. X.R.

260—327, 340.5, 345.7, 488, 514, 516, 518, 520

PO-1050
(5/69)

UNITED STATES PATENT OFFICE
CERTIFICATE OF CORRECTION

Patent No. 3,567,770    Dated  March 2, 1971

Inventor(s)  George Karmas

It is certified that error appears in the above-identified patent and that said Letters Patent are hereby corrected as shown below:

The filing date should read August 22, 1967. In Column 2, line 25, "2-ethyl" should read --3-ethyl--. Column 2, line 29, "hydroxy" is misspelled. Column 2, line 61, "diluted" is misspelled. In Column 3, line 65, delete "11.85". Column 3, line 69, insert --C-- before "67.00". In Column 4, line 56, "methyl" is misspelled. In Column 5, line 31, "there" is misspelled. In Column 5, line 35, "296" should read --2.96--. In Column 6, line 35, "$C_1$" should read --$C_{17}$--. Column 6, line 50, "$H_{33}$" should read --$H_{23}$--. In the abstract, line 21, "arcyl" should read --acyl--.

Signed and sealed this 13th day of July 1971.

(SEAL)
Attest:

EDWARD M. FLETCHER, JR.          WILLIAM E. SCHUYLER, J
Attesting Officer                Commissioner of Patent